3,164,206
METHOD AND PRODUCT FOR PRODUCING
FLOW IN DEAD WELLS
Thomas I. Sharp, 3742 Durness Way, Houston, Tex.
Filed Aug. 21, 1961, Ser. No. 132,853
7 Claims. (Cl. 166—38)

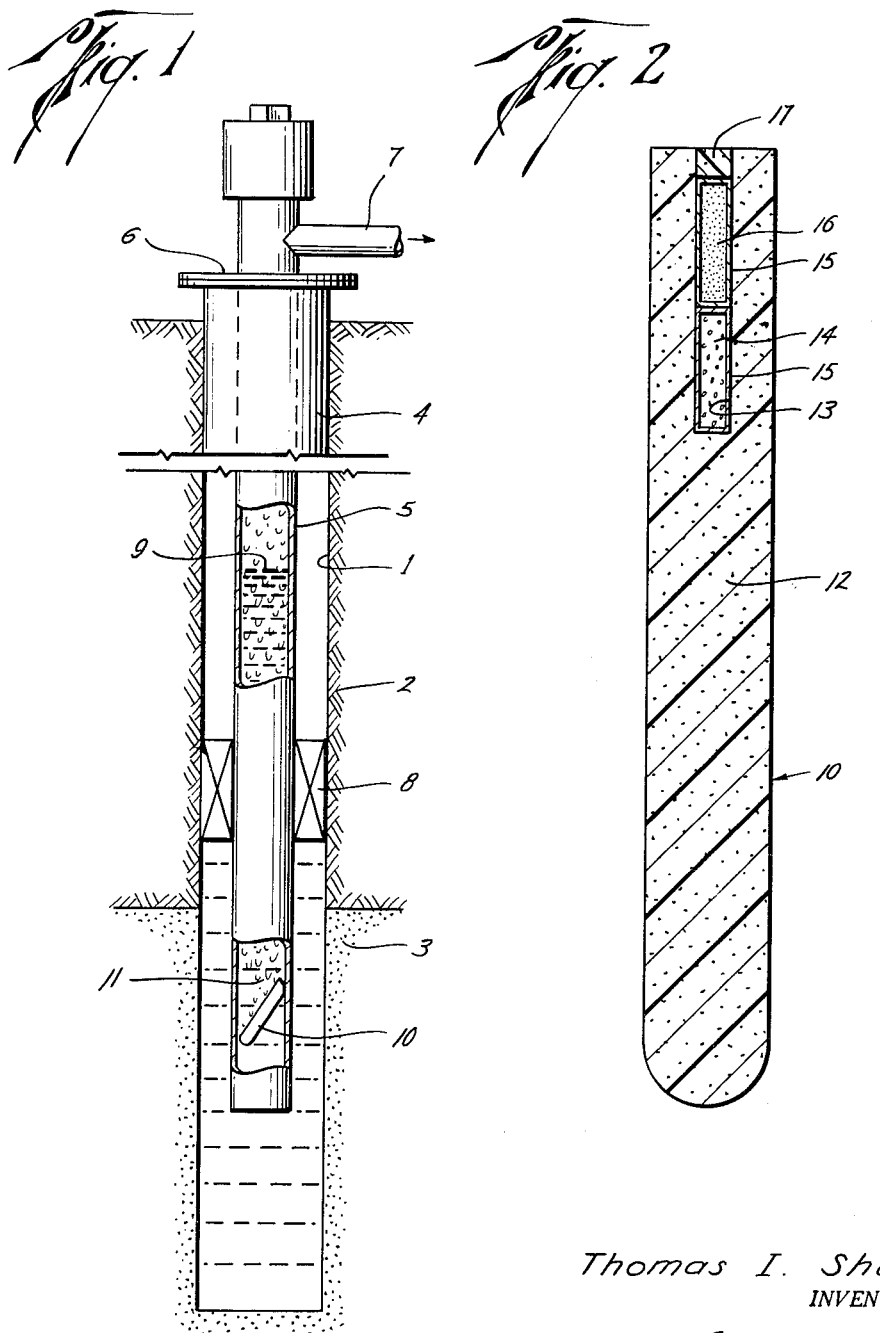
Thomas I. Sharp
INVENTOR.
BY Browning, Simms,
Hyer & Eickenroht.
ATTORNEYS United States Patent Office 3,164,206
Patented Jan. 5, 1965

This invention relates to a method and product for producing or causing flow of liquid from wells in which there is a standing column of liquid exerting such pressure on the formation surrounding the well that substantially no gas or liquid can flow into the well. The invention is particularly adapted for use in oil and gas wells or the like, but may be employed in wells producing water or other liquids.

When a well producing gas or gas and oil becomes partly drowned by water collecting in the well until it stands therein a quiescent column, the water must be removed in order that sufficient production of hydrocarbons from the well can be secured. This is sometimes also true of wells producing oil in which the oil accumulates in a column until it exerts sufficient pressure on the formation to prevent the gas from entering the well and lightening the oil sufficiently so that it will flow. In an oil or gas well which produces water, it is a fairly frequent occurrence that the water will accumulate even while the well is flowing gas until the well becomes so filled with water that all production from it will cease. This type of well generally is known as a "drowned" well.

In the past, in wells in which there has been some production of gas still continuing despite accumulated water or the like, a foaming agent, such as a water-soluble or water and oil soluble surfactant such as soap and sulfonated petroleum oil has been added to the well, both in liquid and in stick form. The stick form may employ a product such as urea as a binder and a quantity of dense material such as barite to make the sticks sink in liquids such as brine. Surfactants including foam sticks are available on the market from various sources such as Halliburton Oil Well Cementing Company, of Duncan, Oklahoma, and Petrolite Corporation, of St. Louis, Missouri. Such agent has been found very efficient in lowering the surface tension of the water and is capable of producing large volumes of foam where the well is producing some gas. The gas entering the well will cause large volumes of foam in the water which has thus had its surface tension reduced, and this foam traveling upward in the well bore will carry the water contained therein to the surface for disposal by conventional methods. This method has been found very effective in removing water from a well while there is still sufficient gas production to effect such foaming.

The method just described will not readily produce flow in a well which has been drowned to such a degree that it is not producing a substantial quantity of gas. Although it may eventually produce enough foam to start the liquid flowing from most such wells, the time element involved is in many instances so great as to make it impractical. Such a well must be bailed or otherwise reworked to mechanically remove the water and such reworking is sufficiently expensive so that it is undertaken as a last resort in rehabilitating a drowned well and is applicable only to wells having a sufficient potential to make it economically feasible.

It is an object of the present invention to provide a method and a product for expeditiously and economically activating drowned wells, that is, wells containing a standing column, usually partly water and partly oil or other hydrocarbon, but sometimes all or the one or all of the other, particularly in those cases in which the well does not produce sufficient gas to make a foam in the liquid and thus reduce its density quickly enough to be economically feasible.

It is a further object of this invention to provide such a method and product which will produce adequate submergence of gas in the liquid column in the well to provide the maximum ligthening of the column and thus the most favorable conditions for flowing of the liquid from the well.

Other objects and advantages of this invention will become apparent from the following description taken in connection with the accompanying drawings wherein is set forth by way of illustration and example one embodiment of the present invention.

In the drawings:

FIG. 1 is a longitudinal cross-section view illustrating diagrammatically a drowned well and the action of the present invention in causing flow of a column of liquid therefrom; and FIG. 2 is a longitudinal cross section through a preferred form of the article of this invention which is usable in carrying out the method of the invention.

As illustrated in the drawings and more specifically described in this specification, the objects of this invention are accomplished by providing in addition to the usual "foam" stick or other form of water-soluble surfactant material, a means for introducing into the well into the column of fluid therein an extraneous gas to vastly expedite production of the desired foam in the liquid column after the liquid column has had its surface tension reduced by the foaming agent. More specifically, such gas has been provided in situ in the liquid by means of the introduction of the material capable of effervescing with a violent exothermic reaction in the presence of the liquid. Conveniently this effervescent material is introduced into the liquid by incorporating it into an otherwise conventional foam stick in some suitable fashion as by locating it in a hollow in the stick. By this means it is assured that the foaming agent will begin to affect the liquid and lower its surface tension before the introduction of gas from the effervescent material into the liquid begins, so that the liquid will be ready for the actual production of foam at the time the gas begins to be produced in the liquid. Any desired time delay within reason may be accomplished in this fashion by so locating the effervescent material that the action of the liquid on the foam stick will require the desired amount of time before it dissolves enough of the foam stick to reach the effervescent material.

Additionally, it has been conceived that by placing the effervescent material in a hollow in the foam stick, which hollow opens through one end of the foam stick, and by closing such end of the foam stick in such a manner that the action of the liquid on the foam stick will reach the effervescent material through that end, the release of gas from the effervescent material will take place through that end of the foam stick and if the foam stick is placed in the well in such fashion that such end is uppermost, the escape of the gas from the foam stick will provide a jetting type of action that will drive the foam stick deeper into the liquid and produce greater submergence of the gas and deeper foaming of the liquid than otherwise would occur.

Inasmuch as the column of the liquid collecting an a well and preventing it from flowing is not always aqueous in nature, the surfactant of the foam stick should be both water and oil soluble so as to act as intended in an aqueous column of liquid on a column of oil or condensate. It is, likewise, within the concept of this invention that the effervescent material will be such as to effervesce in the presence of oil alone as well as in the presence of water.

Referring now more specifically to the drawings, there is shown in FIG. 1 in diagrammatic fashion a well bore 1 which has been drilled through a formation 2 constituting the overburden into a producing formation 3 capable of producing oil or gas or some other substance which is desired to draw from the earth. The upper portion of this bore hole 1 is provided in the usual fashion with a casing 4 which serves to exclude production from unwanted portions of the overburden. Inside the casing 4 is provided a tubing 5 for flowing the desired substances from the well, this tubing being hung by suitable means 6 from the upper end of the casing 4, and being provided with a flow line 7 for flowing materials from the tubing to such disposition as may be desired on the surface. Conventionally in many instances it is desired that the annulus between the casing and tubing above the producing formation be sealed off at its lower end by means of a suitable packer 8.

It is contemplated that the well illustrated will be of such a nature that liquid consisting of either water or oil or both will accumulate therein to some level such as indicated by the numeral 9, and by such accumulation will provide a hydraulic pressure upon the walls of the formation 3 within the bore hole such that production from such formation 3 will be prevented by the hydraulic backpressure. This is a situation which will naturally come about in many wells if they are closed in entirety for a period of time or caused to flow at a very slow rate.

In order to overcome the situation just described, there is dropped into the well through a suitable trap in the upper end of the tubing a foam stick 10. As contemplated by this invention, this foam stick would be made up of any one of a number of foaming agents readily available on the market. Such foaming agent in order to have substantialy universality of application must necessarily be water soluble and capable of reducing the surface tension of water, and, as above mentioned, it should also in accordance with this invention be oil soluble in order to work in those wells not having water therein.

The foam stick will act initially to carry out the first step of the method of this invention and dissolve in the column of liquid standing in the well to reduce the surface tension of such liquid. After this action begins the introduction of gas to accelerate the production of the foam in the liquid will take place and foam as indicated by the numeral 11 will be very rapidly produced in the column of liquid, thereby lightening the column of liquid and by expansion of the gas carrying a portion of the liquid out of the well until sufficient of the liquid has been discharged so that the hydraulic head exerted on the formation is insufficient to overcome the natural formation pressure. Thereupon gas or gas and liquid from the formation will begin to enter the well and the well will begin to flow.

Upon reference to FIG. 2 it will be seen that the main body of the foam stick 10 is made up of a conventional foaming agent 12 which may, for example, be a soap or other surfactant preferably both water and oil soluble. Such material may be made up of a normally liquid substance mixed with urea or some similar material and molded into a solid body. It will be understood that this invention is not in the specific material or structure of the body of the foam stick or foaming agent, which are conventional.

In accordance with this preferred form of the invention such otherwise conventional foam stick is provided on its interior with a hollow portion 13 preferably extending from one end thereof which in use will be the upper end. This hollow 13 is adapted to receive in suitable form an effervescent material, one suitable example of which is a quantity of powdered aluminum 14 preferably enclosed within a gelatin capsule 15 or the like, and a quantity of caustic soda 16, likewise enclosed within a gelatin capsule 15 separate from that which encloses the aluminum. These gelatin capsules after being placed in the hollow or cavity 13 in the foam stick 12 are sealed therein by means of a suitable plug 17 which may be of the same material as the foam stick body 12, but which in any event should be soluble in the liquid in which the foam stick is to be used so that after a predetermined amount of time in such liquid this plug 17 will be dissolved by the liquid and the liquid will reach the gelatin capsules 15 dissolving the same and will thereupon act upon the powdered aluminum and caustic soda to produce large quantities of gas at a very rapid rate.

If the cavity 13 within the foam stick be located as illustrated with its opening from the upper end of the foam stick as the foam stick is used in the well, then when the generation of this gas begins the gas will be discharged upwardly from the foam stick very strongly and thereby drive the foam stick deeper into the liquid.

Of course the effervescent material can be incorporated into the foam stick in any manner desired, but when incorporated in this manner it is especially useful in wells having a high salt content wherein the accumulated liquid is of such high density that the conventional foam stick might remain at or close to the surface of the liquid or sink slowly and the gas generated would, in the absence of the foam stick being driven down into the liquid, as above described, be far less effective.

It is contemplated by this invention that the gas may of course be supplied by any desired means and that when supplied by an effervescent substance, such effervescent substance may be introduced into the well in any manner desired as well as that specifically here disclosed, although that here described is preferred and is productive of certain advantages as hereinbefore explained.

It will be seen from the foregoing that a method has been provided whereby wells completely drowned so that no substantially quantities of gas are being produced therefrom can be activated. It is, of course, apparent that the same method may be employed in wells in which some gas is being produced such that the wells might be activated by the ordinary foaming agent, but that with the use of the present invention much better results may be secured. It is further apparent that an especially convenient and desirable article for use in carrying out the above method has been devised and herein illustrated and described, making the method simple to carry out and making it possible to predetermine the time elements involved in carrying out the method so that the time elements most suited for the particular situation at hand may be employed.

From the foregoing it will be seen that this invention is one well adapted to attain all of the ends and objects hereinabove set forth, together with other advantages which are obvious and which are inherent to the method and article.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An article of manufacture consisting of a foam stick for treating wells to induce flow of fluid therefrom, said stick comprising an elongated body of foaming agent soluble in a well fluid of a well to be treated thereby and having a cavity therein, an effervescent agent in said cavity adapted to effervesce when contacted with such well fluid, and a plug retaining said effervescent agent in said cavity.

2. An article as set forth in claim 1 in which said plug is soluble in such fluid whereby it will dissolve and admit such well fluid to said cavity after a predetermined period of immersion of said body in such fluid.

3. An article in accordance with claim 1 in which said cavity extends from one end of said body whereby said plug will dissolve and admit such fluid to said cavity from said end after a predetermined period of immersion in such fluid, to thereby produce a rush of gas from said cavity through said end.

4. The method of treating a well having a column of liquid standing therein and exerting a sufficient hydraulic pressure on the well formation to prevent gas from flowing from the formation into the well in substantial quantities, which method comprises introducing into said column of standing liquid a foaming agent forming the outer part of a body and soluble in said liquid to lower the surface tension thereof, and an effervescent agent enclosed in said outer part of said body, which effervescent agent is of a character adapted to effervesce upon contact with said liquid, whereby the effervescence of said effervescent agent will be delayed until after said foaming agent begins to dissolve.

5. An article of manufacture in accordance with claim 1 in which the effervescent agent is a material which will effervesce with a violent exothermic reaction upon contact with such well fluid.

6. An article of manufacture in accordance with claim 1 in which the effervescent agent is comprised of powdered aluminum and caustic soda.

7. The method in accordance with claim 4 in which one portion of the foaming agent forming said outer part of said body is thinner than other portions forming said outer part of said body, said one portion providing a thinnest portion of said outer part, and said body is introduced with said thinnest portion uppermost so that the gas from said effervescence is ejected from said body in an upward direction to propel said body deeper into said liquid to produce adequate submergence of the gas in said liquid.

References Cited in the file of this patent

UNITED STATES PATENTS 2,168,116    Crites et al. _____ Aug. 1, 1939
2,748,867    Lissant _____ June 5, 1956

OTHER REFERENCES

Dunning et al.: "Foaming Agents Are Low-Cost Treatment for Tired Gassers," Oil and Gas Journal, vol. 57, No. 6, February 1959, pp. 108–110.

Lissant et al.: "Chemical Applications Help Unload Oil, Gas Wells," Oil and Gas Journal, vol. 58, No. 6, June 6, 1960, pp. 124–126.